Jan. 29, 1963 G. MARISSAL 3,075,885
PROCESS FOR THE STABILIZATION BY PHYSICAL MEANS
OF THERMOMINERAL PLANKTONIC COMPLEXES
Filed Sept. 18, 1957
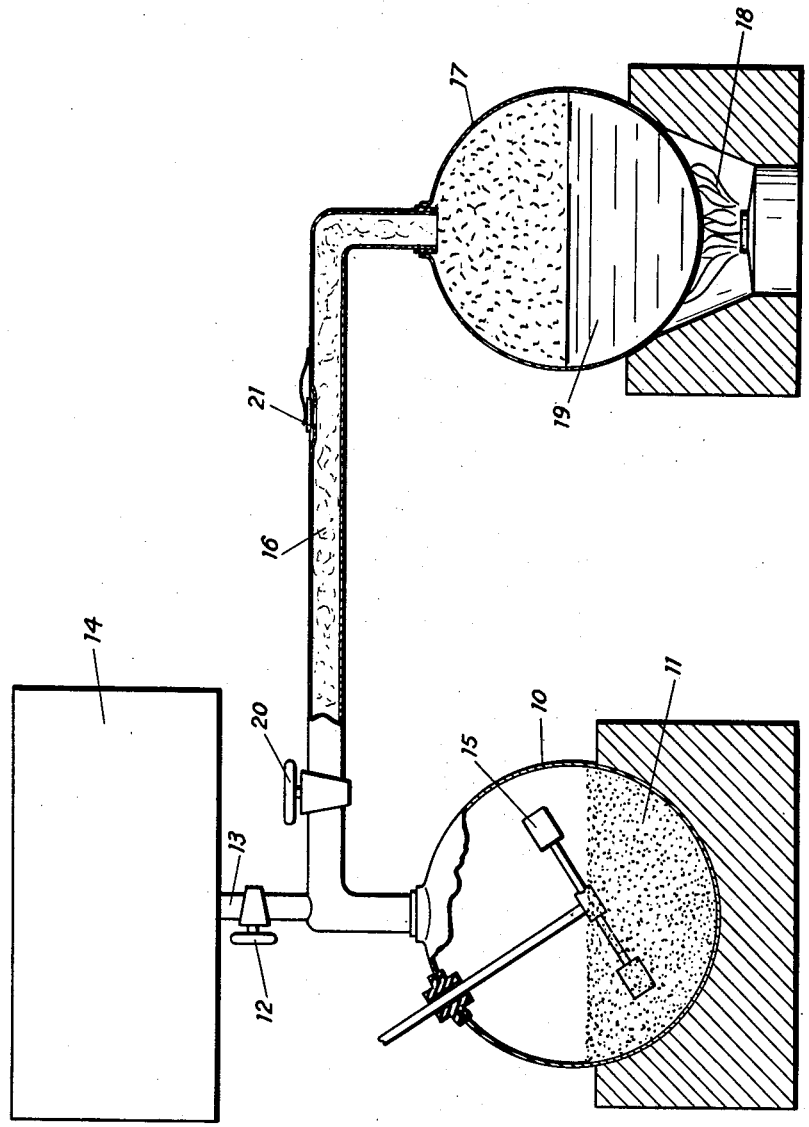
INVENTOR
GEORGES MARISSAL
BY Irwin S. Thompson
ATTY.

United States Patent Office 3,075,885
Patented Jan. 29, 1963

3,075,885
PROCESS FOR THE STABILIZATION BY PHYSICAL MEANS OF THERMOMINERAL PLANKTONIC COMPLEXES
Georges Marissal, 187 bis Promenade des Anglais, Nice, Alpes Maritimes, France
Filed Sept. 18, 1957, Ser. No. 684,766
Claims priority, application France July 12, 1957
4 Claims. (Cl. 167—90)

The present invention relates to thermo-mineral planktonic complexes, that is to say to the organic substances consisting of the various micro-organisms extracted from natural mineral waters, then activated and cultivated by a known process.

After being gathered, these planktonic complexes are extremely liable to deteriorate, not only because of their organic nature but also because of their very unstable colloidal constitution and the present invention relates to a process for the stabilization, by physical means, of said complexes, in such a manner as to preserve for a long time the integrity of their structure and of the active and radioactive properties which are their essential features.

As set forth in my Patent No. 2,866,297, it is known that mineral waters, and particularly those from sulphur springs, contain various micro-organisms which, once they are collected, constitute a true plankton. It has been found that this plankton has vitalizing and even ionizing properties which it has already been suggested should be turned to the advantage for various cosmetic. dietetic, and, if necessary, dermatological uses.

The process according to the invention consists in subjecting the planktonic complexes first to an extremely rapid freezing, for two or three seconds for example, at a very low temperature of the order of —80°, and secondly to dehydration under vacuum. The rapidity of the freezing has the effect of preventing the substances from passing through the secondary states usual with slower cooling; these secondary states would actually be liable to harm the stabilization of the planktonic complexes. As for the dehydration under vacuum and at a very low temperature, this leads, through a sublimation phenomenon, to the complete vaporization of the frozen water contained in the planktonic complexes.

After these operations, the dried planktonic complexes appear in the form of flakes, which form does not facilitate bringing the product back into solution, and according to the invention the treatment continues with an atomizing operation according to which the planktonic complexes are reduced to extremely minute particles, the dimensions of which are close to those of the molecule. In this state, the planktonic complexes are easily soluble and the invention provides for preserving them either by maintenance in a rarified atmosphere in sealed receptacles or by coating them, on the molecular scale, with a mist of a hydrophilic lipide such as lanoline.

As sealed receptacles, the use of bottles stoppered in a sealed manner by a perforable plastic cap is recommended. It is thus possible to introduce sterilized water therein by means of a hollow needle fitted to a syringe and the product recovers the whole of its properties without risking being contaminated by extraneous germs.

The technical operations of freezing, dehydration under vacuum, and atomization of the planktonic complexes may be fulfilled in apapratus of known construction, but for coating the complexes, the invention provides a preferred device comprising a receptacle under vacuum, fitted with an agitator and containing the planktonic complexes to be coated; said receptacle may be connected by means of a conduit controlled by a stop-cock, with another receptacle associated with heating means and containing the coating lipide.

One embodiment of such a coating apparatus is illustrated diagrammatically, by way of example, in the accompanying drawing.

In this drawing 10 is a receptacle adapted to receive a certain quantity 11 of dehydrated and atomized planktonic complexes. This receptacle is in communication, by means of a stop-cock 12, with the suction pipe 13 of a pump or of an ejector. Moreover, the receptacle 10 is provided with an agitator 15 actuated in any suitable manner. Finally, the receptacle 10 is connected by means of a conduit 16, with a second receptacle 17, placed on a source of heat 18 and containing a certain quantity 19 of lanoline or other hydrophilic lipide. The conduit 16 is controlled by a stop-cock 20 and is preferably provided with a spring-loaded valve 21.

The apparatus thus described is used as follows:

When the receptables 10 and 17 have been filled respectively with atomized planktonic complexes 11 and lanoline 19, the stop-cock 20 is closed and the pump 14 and the source of heat 18 are set in action in such a manner as to produce a vacuum in the receptacle 10 and to produce lanoline vapour in the receptacle 17 and the conduit 16. The valve 21 can lift as soon as the pressure becomes too high in the receptacle 17 so that there is no risk of explosion to be feared.

When the vacuum in the receptacle 10 and the temperature in the receptacle 17 have reached suitable values, the agitator 15 is set running in such a manner as to whirl the molecules of planktonic complexes and the stop-cock 20 is opened abruptly. Under the influence of the vacuum, the lanoline vapours are precipitated in the form of a mist into the receptacle 10 where they coat the atomized planktonic complexes. Because of the extremely fine division of the material, this coating is effected at the molecular scale and is therefore particularly effective.

The planktonic complexes thus coated are preserved for a long time and retain their essential active and radioactive properties.

It is understood that the invention is in no way limited to the example of an apparatus which has just been described and that many modifications could be made to the details of its construction without going outside the general scope of this invention.

I claim:

1. A process for stabilizing by physical means planktonic complexes collected in sources of mineral waters, comprising: freezing said complexes in a few seconds down to a temperature of about —80° C., dehydrating said complexes by vacuum at said low temperature, atomizing said dehydrated complexes while in a frozen condition, restoring the same to normal temperature and enclosing it in sealed receptacles under a rarefied atmosphere.

2. A process for the stabilization by physical means of planktonic complexes collected in sources of mineral waters, comprising: freezing said complexes in a few seconds down to a temperature of about —80° C., dehydrating said complexes by vacuum under said low temperature, atomizing said dehydrated complexes while in a frozen condition, stirring said atomized particles under vacuum in a closed receptacle and suddenly admitting into said receptacle a mist produced in another receptacle by heating a hydrophilic lipide; thereby coating said stirred atomized particles with said lipide, and storing said coated atomized particles of planktonic complexes in a receptacle.

3. A process for the stabilization by physical means of planktonic complexes collected in sources of mineral waters, comprising: freezing said complexes in a few seconds down to a temperature of —80° C., dehydrating said complexes by vacuum under said low temperature, atomizing by comminution said dehydrated complexes while in a frozen condition, restoring the same to normal temperature, stirring said atomized complexes under vacuum in a closed receptacle, and suddenly admitting into said receptacle a mist produced in another receptacle by heating a mass of lanoline; thereby coating said stirred atomized particles with said lanoline and storing in a receptacle the resulting mixture comprising said particles of planktonic complexes dispersed within a mass of lanoline.

4. An industrial product, soluble in water comsisting of freeze-dehydrated, hydrophilic lipide-coated planktonic complexes, the plankton having been initially collected in sources of mineral waters, and the freeze-dehydration having been accompanied by vacuum-atomization of the hydrophilic lipide.

References Cited in the file of this patent

UNITED STATES PATENTS

| | | |
|---|---|---|
| 1,420,888 | Straw | June 27, 1922 |
| 1,707,684 | Picker | Apr. 2, 1929 |

| | | |
|---|---|---|
| 2,310,650 | Peebles | Feb. 9, 1943 |
| 2,576,952 | Lowe | Dec. 4, 1951 |
| 2,616,604 | Tolsom | Nov. 4, 1952 |
| 2,799,241 | Wurster | July 16, 1957 |

FOREIGN PATENTS

| | | |
|---|---|---|
| 16,846 of 1887 | Great Britain | May 15, 1888 |
| 20,715/29 | Australia | June 18, 1929 |
| 403,691 | Italy | 1943 |
| 514,047 | Great Britain | Oct. 30, 1939 |

OTHER REFERENCES

Burlew: Algal Culture, Carnegie Institution of Washington pub. 600, 1953, Washington, D.C., pp. 15, 16, 190–196, 260, 262. (Copy in Div. 1.)

De Navarre: The Chem. and Mfg. of Cosmetics, D. Van Nostrand Co., 1941, N.Y., pp. 31, 33. (Copy in Div. 43.)

Freezing and Drying, Institute of Biology, London, 1951, pp. 12, 13, 43–47. (Copy in Div. 43.)